United States Patent [19]

Hurd

[11] 4,421,168

[45] Dec. 20, 1983

[54] SURFACTANT WATERFLOODING WITH GRADED SALINITY DRIVE FOR OIL RECOVERY

[75] Inventor: Billy G. Hurd, Dallas, Tex.

[73] Assignee: Mobil Oil Corporation, New York, N.Y.

[21] Appl. No.: 205,354

[22] Filed: Nov. 10, 1980

[51] Int. Cl.³ .............................................. E21B 43/22
[52] U.S. Cl. ...................................... 166/273; 166/274
[58] Field of Search ............ 166/273, 274, 275, 305 R

[56] References Cited

U.S. PATENT DOCUMENTS

| | | | |
|---|---|---|---|
| 3,437,141 | 4/1969 | Brandner et al. | 166/273 |
| 3,470,956 | 10/1969 | Boston et al. | 166/273 |
| 3,474,864 | 10/1969 | Hurd | 166/273 X |
| 3,714,062 | 1/1973 | Askew et al. | 166/273 X |
| 3,827,499 | 8/1974 | Norton et al. | 166/274 X |
| 3,908,764 | 9/1975 | Harvey | 166/273 X |
| 3,977,471 | 8/1976 | Gale et al. | 166/273 |
| 4,008,768 | 2/1977 | Birk | 166/274 |
| 4,181,178 | 1/1980 | Savins | 166/274 |
| 4,232,737 | 11/1980 | Tyler et al. | 166/273 |
| 4,235,290 | 11/1980 | Kalfoglou | 166/273 |

*Primary Examiner*—Stephen J. Novosad
*Assistant Examiner*—George A. Suchfield
*Attorney, Agent, or Firm*—C. A. Huggett; M. G. Gilman; E. F. Kenehan

[57] ABSTRACT

An improved recovery process is provided for fluent petroleum in a porous formation having spaced injection means and production well recovery means which includes a concentrated brine drive and surfactant carrier system. By injecting an aqueous drive medium having gradually decreasing brine concentration, surfactant transport and petroleum recovery efficiency are improved. Advantageously, an effective aqueous surfactant composition is formulated containing a water-soluble ether-linked sulfonate surfactant, a cosurfactant alcohol, and at least one cosurfactant or sacrificial sulfonate material in a concentrated brine carrier.

21 Claims, 5 Drawing Figures

SURFACTANT WATERFLOODING WITH GRADED SALINITY DRIVE FOR OIL RECOVERY

BACKGROUND OF THE INVENTION

This invention relates to the recovery of petroleum from subterranean oil reservoirs. In particular, it relates to improved waterflooding operations involving the injection of a surfactant slug and drive fluid comprising concentrated brine.

In the recovery of oil from oil-bearing reservoirs, it usually is possible to recover only minor portions of the original oil in place by primary recovery methods which utilize only the natural forces present in the reservoir. A variety of supplemental recovery techniques has been employed in order to increase the recovery of oil from subterranean reservoirs. A widely used supplemental recovery technique is waterflooding, which involves the injection of aqueous media into the reservoir. As the water moves through the reservoir, it acts to displace oil therein to a production well system through which the oil is recovered.

Interfacial tension between the injected waterflooding medium and the reservoir oil, the relative mobilities of the reservoir oil and injected media, and the wettability characteristics of the rock surfaces within the reservoir are factors which influence the amount of oil recovered by waterflooding. Thus, it has been proposed to add surfactants to the flood water in order to lower the oil-water interfacial tension and/or alter the wettability characteristics of the reservoir rock. Viscosifiers such as polymeric thickening agents may be added to all or part of the injected water in order to decrease the mobility ratio between the injected water and oil and improve the sweep efficiency of the waterflood.

Techniques involving the injection of an aqueous solution of brine-tolerant surfactants have been developed for use under controlled conditions of salinity. Processes which involve the injection of aqueous surfactant solutions have been described in U.S. Pat. Nos. 3,508,612, 3,827,497, 3,890,239, 3,977,471 and 4,018,278, for instance. The surfactant slug may be followed by a thickened water slug which contains a viscosifier such as a water-soluble bipolymer in a graded concentration in order to provide a maximum viscosity greater than the effective viscosity of the flowing oil-water bank and a terminal viscosity near that of water. A driving fluid such as a field brine may be injected with or without the thickener to carry process to conclusion.

In the subterranean formation connate water may be present, often as a highly concentrated or saturated brine containing 10 to 20 weight percent sodium chloride, with smaller amounts of other soluble inorganic salts, especially Ca and Mg halides. The injected water customarily employed is oil field brine, which ordinarily contains at least 1% salt. By adding brine-tolerant surfactants to the available fluids, recovery of the petroleum can be enhanced. However, employing adequate surfactant to enhance the recovery of oil from the subterranean formation by the flooding water has not been economically feasible heretofore because the surfactants are absorbed from the surfactant solution onto the rock surfaces of the subterranean formation. As a result of this absorption of the surfactant, the concentration of the surfactant in the flooding water becomes less than that required to achieve enhanced recovery of the oil. Moreover, the adsorption, where the surfactant is a mixture, causes a chromatographic dispersion to separate components of the surfactant mixture on the basis of their relative sorptivity. Frequently, this dispersion destroys the efficacy of the surfactant mixture in lowering the interfacial tension between the flooding water and the oil being displaced within the formation.

Brine-tolerant surfactants are generally expensive chemical compositions, and less expensive sacrificial agents can be employed to prevent undue material losses. Alternatively, the saline surfactant solution may be followed by a less-saline water and flooding water, whereby the surfactant absorbed onto the formation surface from the initial surfactant slug is desorbed by the less-saline water. This latter technique is described in U.S. Pat. No. 3,474,864. Varying the composition of surfactant and brine drive fluids has also been disclosed in U.S. Pat. Nos. 3,346,047, 3,434,542 and 3,477,508. It is generally known in surfactant waterflooding technology to follow a relatively high saline surfactant slug with one of sharply-reduced salinity. Presence of a certain amount of salt prevents swelling and dispersion of clay materials in some formations. For instance, experimental Berea sand stone cores and many of the shaly-sand reservoirs in the Texas gulf coast region cannot tolerate water having a salinity below about 0.6% TDS, and this concentration may be a lower limit for practical water flooding operations in such formations if permeability damage is to be prevented. Ordinarily, the ambient saturation for NaCl defines a practical upper limit for brine salinity.

The fluid dose rate for surfactants, saline solutions, thickened drives, etc., can be expressed as a fraction of the pore volume (PV). This expression is commonly used to describe the void space in a natural geologic formation or a laboratory simulation, such as sand-packed tube. Progression of fluid through a formation is a slow process, being expressed in a few meters per day, or considerably less. When describing the treatment of a formation with 0.1 PV of surfactant slug, a period of days is usually implied, even for long tube scaled systems. Were a 10% equivalent pore volume to be injected in a natural formation, the linear rate might require months to inject.

For instance, certain connate waters having total dissolved solids (TDS) of 12 to 23 weight percent or more are found in natural formations, and are available for use as carriers or driving fluids. Pure water may be costly or obtainable in limited amount, requiring precise measures to be taken in conservation. It is known to drive a surfactant slug with successive fractional pore volumes of high-salinity brine, followed by a sharply-reduced concentration in the subsequent slug. It is believed that such drastic reduction in salinity contributes to reductions in reservoir permeability and/or to promotion of high emulsion viscosity, and results in higher operating pressures to maintain a constant linear flow rate in the formation.

SUMMARY OF THE INVENTION

By reducing salinity from the high concentration to the desired low concentration in a plurality of spaced or variable increments, it has been found that lower pressure is required to maintain the recovery process.

Economic operation of a modern waterflooding process requires low pressure drop, miminized chemical loss and optimum oil recovery to be successful. By the present process, a relatively low total pore volume throughput and low process drop can be obtained. By incrementally or continuously varying the salt content of a brine driving medium, an effective surfactant waterflooding technique can be achieved, in which a thorough recovery is obtained without undue energy being consumed in pumping the fluids. By gradually decreasing the salt concentration of a rich brine from high-salt to low-salt content, formation of viscous, low mobility emulsions can be minimized.

This invention may be used advantageously in surfactant water flooding processes wherein the surfactant slug contains at least one anionic surfactant, such as hydrocarbyl-polyalkoxy sulfonate or sulfate. Multicomponent surfactant materials are advantageous, especially containing cosurfactants and sacrificial agents.

A method is provided for recovering oil from a subterranean formation containing oil and having at least one injection well and at least one production well. The improved technique may include injecting through an injection well and into the subterranean formation an aqueous saline surfactant solution sufficient surfactant to effect an interfacial tension between said aqueous saline surfactant solution and said oil of less than about 0.1 dyne per centimeter. Immediately following the aqueous saline surfactant solution, or subsequently delayed, an aqueous brine drive fluid having initial saline concentration of salt at least 75% of the surfactant salinity concentration is injected, followed by gradually decreased salt concentration of the drive fluid at a rate sufficient to prevent exessive pressure drop in the formation. Sufficient additional drive fluid is injected for recovering oil from a production well. Where the surfactant solution contains 10 to 15% or more salt, the drive fluid salt concentration is decreased incrementally by a plurality of steps between the high concentration and a low concentration, preferably wherein each incremental decrease is a differential amount less than about one-third of the initial salt concentration.

In one aspect of the present invention, there is provided a new and improved waterflooding process employing a surfactant solution in highly saline brine comprising an alcohol and an ether-linked surfactant which exhibit contrasting oil-water solubility preferences. In carrying out the invention, at least a portion of the fluid introduced into the oil reservoir via a suitable injection system is an aqueous liquid containing a preferentially oil-soluble alcohol of limited water solubility and a preferentially water-soluble anionic surfactant comprising a hydrocarbyl ether-linked sulfonate or sulfate wherein the hydrocarbyl group provides a lipophilic surfactant base and wherein the ether linkage is provided by an alkoxy linkage having a ratio of carbon atoms to oxygen atoms within the range of 2 to 3. In a preferred embodiment of the invention, the preferentially oil-soluble alcohol is an aliphatic alcohol containing from 5 to 7 carbon atoms. Preferred ether-linked surfactants for use in highly saline solutions are sulfonated polyethoxylated aliphatic alcohols having 2 to 4 ethylene oxide units and in which the aliphatic group providing the lipophilic base contains from 16 to 18 carbon atoms.

The ether linkage of the anionic ether-linked sulfates or sulfonates employed in carrying out the present invention with highly-saline water preferably is provided by an alkoxylated group derived from ethylene oxide or propylene oxide or mixture of ethylene oxide and propylene oxide. The number of alkoxy groups in the ether linkage will vary depending upon such factors as the character of the lipophilic surfactant base and the salinity of the aqueous surfactant solution, but normally the ether linkage will contain from 1 to 20 alkylene oxide units.

Ether-linked sulfonates exhibit better thermal stability than sulfate derivatives and a preferred ether-linked sulfonate for use in carrying out the present invention is characterized by the formula $$R_1-(OC_nH_{2n})_xOR_2-\overset{R_3}{\underset{|}{}}SO_3^-M^+ \qquad (1)$$

wherein $R_1$ is a lipophilic base provided by a $C_8$ to $C_{22}$ aliphatic group or an aliphatic substituted aryl group containing from 5 to 24 aliphatic carbon atoms with at least one aliphatic substituent containing at least 5 carbon atoms, n is 2 or 3, x is a number within the range of 1 to 20, $R_2$ is a $C_1$ to $C_4$ alkane group, $R_3$ is a hydrogen, a hydroxy group of a methyl group, and M is an alkali metal or nitrogenous base.

DESCRIPTION OF PREFERRED EMBODIMENTS

In this description, parts by weight and metric units are employed, unless otherwise state. Although significant variations in surfactant compositions are set forth, common components include the following:

Surfactant A is a reaction product of propane sultone and a sodated commercial ethoxylated $C_9$ alkyl phenol known as "Igepal C0430" (GAF Corp.). This has a structural formula as follows:

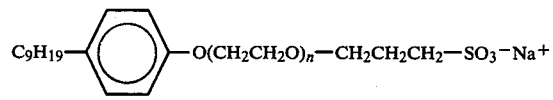

where n averages 4.

The standard petroleum sulfonate used herein is "TRS-40" (Witco Chem. Corp.), and the amounts given herein refer to active sulfonate material in the commercial product, which also contains oil and water along with the 40–43% active material. This petroleum sulfonate has an average equivalent weight of about 342. The cosolvent aliphatic alcohol preferred herein is n-hexanol. Lignosulfonate is employed optionally and is identified as "ERA-5" (American Can Co.).

Standardized laboratory oil displacement tests are performed with regard to crude oil employing elongated flow tubes. In each standard run, the tube is packed with unconsolidated Berea sand and then saturated with saline water. The crude oil is then flooded into the tube until the effluent is water free. The total amount of water displaced from the tube during this operation is measured to determine initial oil saturation. Each tube is subjected to a simulated waterflood by injecting a brine until the effluent is free of oil. The amount of oil produced during this operation is measured in order to determine the residual oil saturation after waterflood of the tube. A simulated surfactant waterflood is then carried out by injecting an aqueous surfactant slug followed by injection of a driving fluid until the effluent from the tube is free of oil. A constant flow rate is maintained equivalent to an advance rate of about 2 meters per day (6.6 ft./day). The amount of oil recovered during this operation is measured in order to determine recovery efficiency. Unless otherwise noted, water used in the initial water saturation step, the simulated waterflood, the surfactant slug, and the drive fluid is a mixed bring containing 16.6 weight percent total dissolved solids, dominantly NaCl with 1.2% Ca+Mg. A polymeric thickening agent may be employed to provide viscosity. A 0.1% solution of Kelzan has a viscosity of about 45 centipoises (cp) at 76° F., the temperature employed for tests unless otherwise stated. The polymer used is the anionic polysaccharide B-1459 produced by fermentation of glucose with the bacterium *Xamthomonas campestris* (NRRL B-1459 USDA) which is available from the Kelco Company under the trade name "Kelzan".

Figure 1:
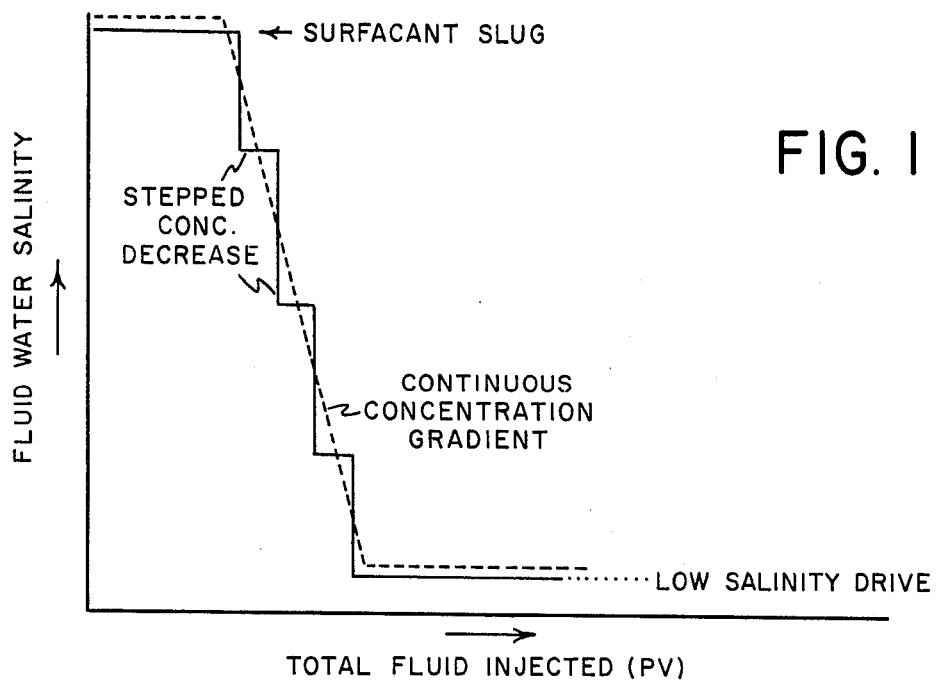
FIG. 1 is a graphic plot of salt concentration vs. injected fluid volume, for a typical graded salinity drive.

The rate of salinity decrease may be expressed as a fraction of initial salt concentration ($C_{so}$), for instance a decrease from 16 weight percent to 12 percent could be expressed as 16-12/16=0.25 fractional difference. This gradual change in salinity over a fractional pore volume of 0.1 PV could be achieved by continuously decreasing salinity over the same period or by stepwise reduction not exceeding the equivalent fractional concentration difference. This is depicted graphically in FIG. 1. The number of changes in driving fluid composition can be determined for the particular formation, brine, petroleum and surfactant materials involved.

By gradually decreasing the drive fluid salinity from the high salt concentration of the surfactant slug, pore plugging and other phenomena related to formation of high viscosity microemulsions and macroemulsions can be decreased markedly. The effect of an incremental decrease in drive fluid salinity is shown in the following example, plotted on FIG. 2.

EXAMPLE 1

Figure 2:
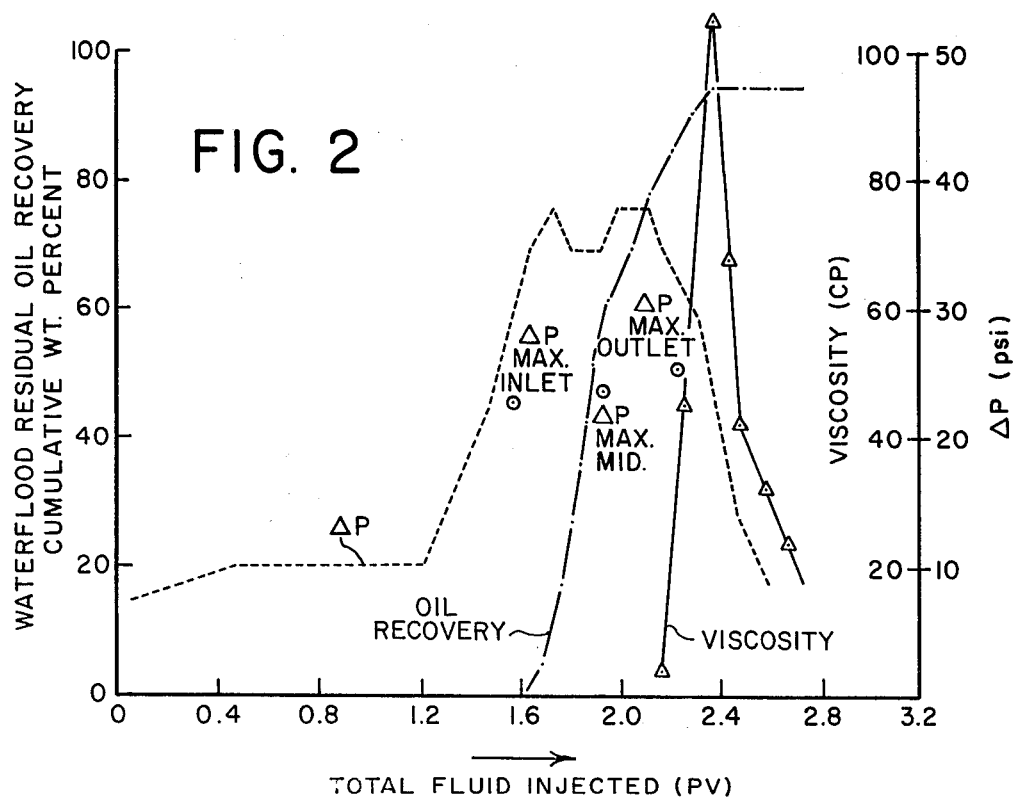
FIGS. 2 and 3 are plots of cumulative oil recovery, pressure, and produced fluid viscosity for experimental waterfloods.

A standard sand pack reservoir simulator is provided with 24 feet (7.4 m) of Berea sand and is loaded with crude oil in standard test apparatus. The surfactant slug consists of brine containing 16.6% total dissolved solids; to which is added 0.1% nonylphenyl-tetraethoxypropane sulfonate, sodium salt (surfactant A); 0.1% petroleum sulfonate (TRS-40); 0.3% n-hexanol; and 0.6% lignosulfonate (ERA-5). After injecting 1.1 pore volumes (PV) of the surfactant composition; a 0.1 PV slug of 16.6% (TDS) brine drive is followed by three slugs of 0.05 PV brine containing 0.1% Kelzan thickener, with salt concentration of 12%, 8% and 4% TDS, respectively. A further 0.4 PV 0.1% Kelzan drive with 1% TDS and a final 0.83 PV drive of 16.6% brine complete the run. As shown in FIG. 2, oil recovery begins when 1.6 PV total fluids are injected, and accumulates to a total of 95.9%. Pressure drop across the pack is essentially constant during the early portion of the run, increasing sharply at about 1.2 PV to about 38 psi. As the drive fluid progresses through the sand pack, the total pressure differential peaks, with P peaking sequentially across the inlet one-third, middle one-third and outlet one-third. Viscosity measurements for the aqueous phase of recovered fluids increase sharply toward the end of the oil recovery period. The Kelzan drive has a viscosity of about 45 cp; however, the produced aqueous phase reaches a maximum of about 106.9 cp at the end of oil recovery, probably due to formation of a viscous middle or lower phase microemulsion.

From these data it can be concluded that some fingering or channeling of the thickened drive brine occurs as the active displacement front (middle phase microemulsion) progresses through the sand pack, due to formation of the higher viscosity fluid. If the drive fluid following this viscous material is a non-saline or diluted brine water, significant salinity dilution in the active displacement front can occur, resulting in premature dissipation of the low interfacial tension middle phase microemulsion. Excess dilution is prevented by decreasing the drive brine salinity gradually, thus ameliorating the effects of channeling in this critical portion of the system.

EXAMPLE 2

Figure 3:
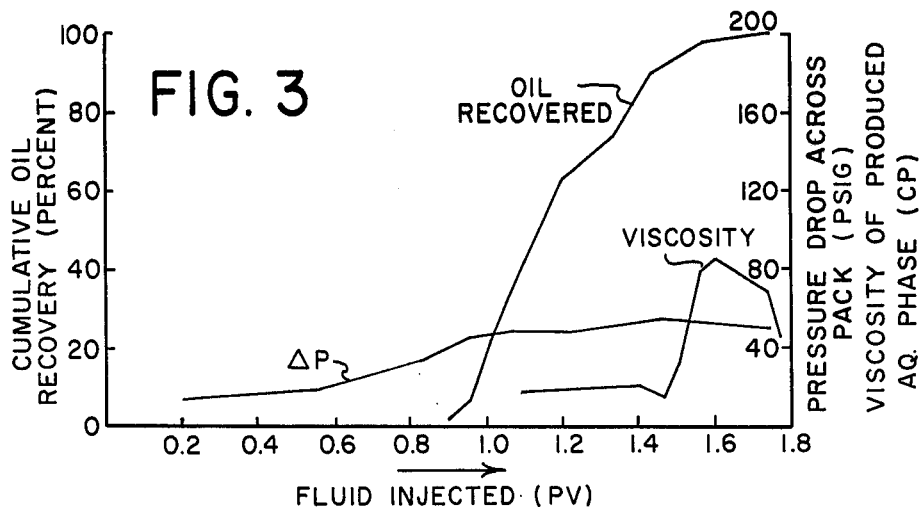

The procedure of Example 1 is repeated except that a smaller surfactant slug and larger drive slug are employed. Following the injection of 0.22 PV of a more concentrated sufactant consisting of 1% Surfactant A, 1% TRS40, 0.35% hexanol, 6% ERA-5 in 16.6% brine, 0.2 PV of concentrated brine (16.6% TDS) is injected, with 0.1 PV of the 12, 8 and 4% graded brine, with 1.56 PV of 1% brine completing the drive sequence. The maximum total pressure across the tube reaches 49 psi for this waterflood, with a maximum pressure differential in the inlet ⅓ section being 28 psi. Maximum viscosity of the produced microemulsion is 79.3 cp, while 96.9% of the oil is recovered. The data are plotted in FIG. 3.

EXAMPLE 3

Figure 4:
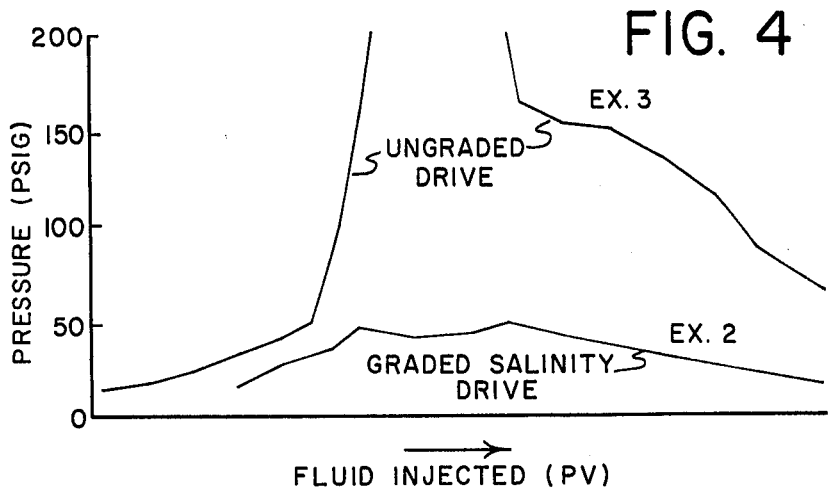
FIG. 4 is a comparative plot of surfactant waterflooding showing pressure drop vs. fluid injected by graded and ungraded salinity drive fluids.

For purposes of comparison, the waterflood drive sequence of Example 2 is repeated except that the brine drive is changed and the length of pack is doubled. The same amount and composition of surfactant is injected, which represents only 0.11 PV of the longer pack, followed by 0.18 PV of 16.6% TDS brine with 0.1% Kelzan, 0.55 PV of 1% TDS brine with 0.1% Kelzan and 0.8 PV of unthickened 16.6% brine. Pressure drop across the first half of this pack, equivalent to total pressure drop in Example 2, rises quickly to 200 psi g, as shown in FIG. 4. The high pressure limit switch on the feed pump cuts out at 200 psi, permitting the pack to bleed off the inlet pressure. Virtually the entire pressure drop is attributed to plugging in the inlet section. Maximum viscosity of produced microemulsion is 203.8, nearly twice that of Example 2. Essentially all of the oil is recovered in this example.

FIG. 4 demonstrates the marked differences in formation plugging that occur when a single large-stepped lower salinity drive is replaced by multiple small-stepped lower salinity drive for the same high salinity surfactant solution.

EXAMPLES 4-6

Figure 5:
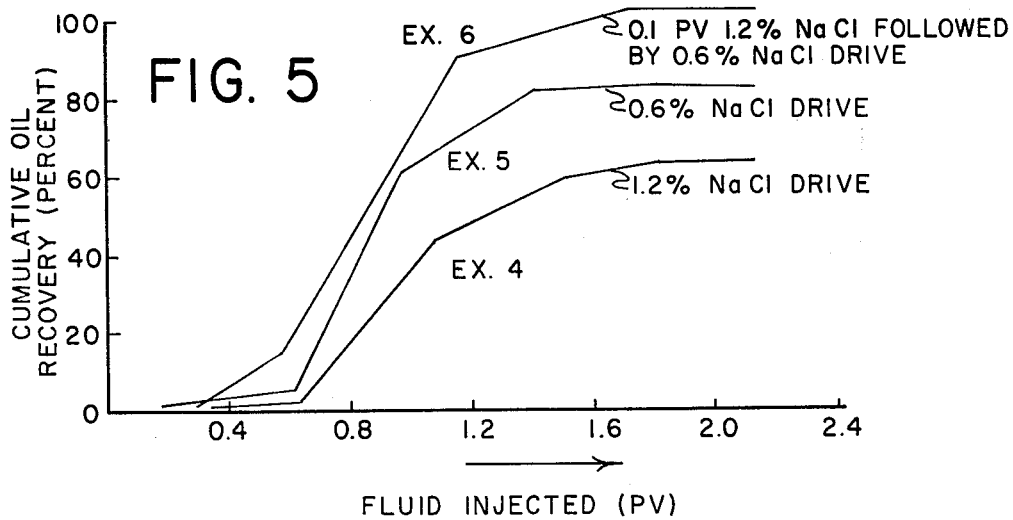
FIG. 5 is a plot of cumulative oil recovery vs. injected fluid for three runs having different stepped salinity drives.

Use of the graded salinity drive technique for low salinity waterflooding does not require a large number of steps in the incremental decrease of salinity. This is demonstrated by comparing three runs having identical surfactant slugs; but, wherein the drive brine salinity is decreased considerably. The standard test procedure above is followed except that the Berea sand pack is a 1.8 m (6 ft.) length of tube 0.6 cm ($\frac{1}{4}$") in diameter. The surfactant slug in Examples 4 to 6 is 0.09 PV of mixed surfactant formation consisting of 1.33 wt.% Stepan "Petrostep 350" petroleum sulfonate, 0.67 wt.% "Petrostep 465" petroleum sulfonate, 0.4 vol. % n-hexanol in a dilute aqueous brine containing 1.8 wt. % NaCl and 0.2 wt. % $Na_2CO_3$. In Example 4, the surfactant slug is driven by 1.2% NaCl brine, with 62% of the residual oil being recovered. In Example 5, the surfactant slug is followed by 0.6% NaCl brine, recovering 83.7% of the oil. In Example 6, a two-step incremental decrease from 1.8% to 1.2% to 0.6% NaCl is employed, the surfactant slug driven initially by 0.1 PV of 1.2% NaCl brine, followed by 0.6% NaCl final drive. The 99% oil recovery from Example 6 is a significant improvement over the ungraded brine drives, as shown in FIG. 5. The higher oil recovery in Example 6 as compared to Example 5 is attributed to less dilution of salinity in the microemulsion displacement front due to dispersive mixing between injected surfactant and the subsequent driving solution. It is believed that the multi-stepped salinity decrease maintains a desirable level of salinity in the microemulsion phase, which is more satisfactory over a longer distance of traverse. Waterflooding techniques employing graded salinity drives are employed to optimum effect with surfactant compositions in which anionic ether-linked sulfonates and cosolvent alcohols are used under conditions such that a surfactant and alcohol exhibit contrasting oil-water solubility preferences. The normal $C_5$ to $C_7$ alkanols are preferentially oil soluble. When mixed with equal amounts of oil and water, a greater amount of the alcohol will dissolve in the oil than in the water. Thus, if the alcohol contacts both oil and water phases, the alcohol will tend to partition between the two with a greater concentration in the oil phase. The preferred alcohols may be characterized as having a water solubility at the reservoir temperature of less than 3.0 weight percent and preferably less than 1.0 weight percent and as being substantially oil miscible. The anionic ether-linked sulfonate employed in conjunction with the alcohol is preferentially water soluble. The ether-linked surfactant may also exhibit some solubility in the reservoir oil or it may be substantially oil insoluble.

Water solubility of directly linked anionic surfactants, such as petroleum sulfonates, is adversely affected by increasing salinity with the result that surfactant precipitation occurs at moderate monovalent salt concentrations and in the presence of even smaller amounts of divalent metal salts. The ether-linked anionic surfactants tolerate much higher salinities since the watersoluble ether moiety is affected by dissolved salts to a lesser degree than the anionic hydrophilic group. Ether-linked sulfates are subject to hydroylsis with the rate of hydrolysis increasing with increasing temperature. These sulfate derivatives are useful in reservoirs having low to intermediate temperatures of up to about 50° C. The sulfonate derivatives on the other hand are much more stable in high temperature environments. Therefore, the use of the sulfonate derivatives usually will be preferred in carrying out the present invention, particularly where the temperature of the reservoir to be floated is about 50° C. or above.

The sulfate or sulfonate anionic group may be linked to any suitable hydrocarbon group which provides a lipophilic base of the surfactant. Thus, the lipophilic base of the anionic ether-linked sulfates or sulfonates employed in the present invention may be provided by aliphatic groups or aliphatic substituted aryl groups. Where the lipophilic base is provided by an aliphatic substituted aryl group, the aryl component may be mononuclear (benzene) or dinuclear (naphthalene) and contains one or more aliphatic substituents. Preferably the aryl component will be mononuclear in view of the practical consideration of economy and product availability. The aryl group is substituted with one or more aliphatic groups, at least one of which has 5 or more carbon atoms with the total number of aliphatic carbon atoms being within the range of 5-24. Where the lipophilic base is provided by an aliphatic radical, it should contain from 8 to 22 carbon atoms. The aliphatic groups or aliphatic substituents may be unsaturated and/or contain branched chains or may take the form of normal aklyl radicals. Where M is an alkali metal ion, it may be sodium or potassium. Various nitrogenous bases, including ammonium or quaternary amines, may be employed. Representative alkylammonium ions include methylammonium, ethylammonium, and normal or isopropylammonium ions, and examples of alkanolammonium ions include monoethanolammonium and triethanolammonium ions.

Preferably the ether linkage is provided by one or more ethylene oxide groups because of the increased water solubility imparted to the molecule. Thus, in a preferred form of surfactant characterized by formula (1), n is 2 and x is a number within the range of 1 to 6. In the case where $R_1$ is an aliphatic group, it preferably contains from 12 to 20 carbon atoms. In the case where $R_1$ is an aliphatic substituted aryl group, the aliphatic substituents preferably contain from 9 to 18 carbon atoms. In this instance, as noted previously, it is desirable that a mononuclear aryl radical such as benzene, toluene, or xylene be employed. As indicated by the formula, the alkane group connecting the sulfonate group with the ether linkage is provided by a $C_1$ to $C_4$ alkane group which may be unsubstituted or which may be substituted by a hydroxy group or a methyl group. Preferably, however, the alkane linkage is provided by an ethane or propane group which is unsubstituted or substituted by a hydroxy group. That is, $R_2$ contains 2 to 3 carbon atoms and $R_3$ is a hydrogen atom or hydroxy group. It is known that many surfactant waterflooding processes are specifically designed for the reservoirs to which they are applied. This specifically depends upon a number of factors including the composition of the reservoir oil, the ionic character of the reservoir water and the water used in formulating the injected surfactant solution, and the reservoir temperature. The HLB of the surfactant which is most effective in the recovery of oil from a particular reservoir depends to some extent upon the ionic strength of the injected water and the connate water within the reservoir. Generally as the salinity increases, due to the presence of monovalent salts such as sodium chloride or divalent salts such as calcium chloride or magnesium chloride, the HLB at which the most efficient oil recovery is achieved likewise increases.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al, incorporated herein by reference. The term "pore volume" as used herein is defined by that volume of the portion of the formation underlying the well pattern employed, as described in greater detail in the Burdyn et al patent.

The present invention may be carried out in conjunction with the use of a thickening agent added for mobility control purposes. The thickening agent may be added to the aqueous solution of alcohol and surfactant or it may be injected in a separate mobility control slug. Where a separate mobility control slug is employed, it normally will be injected immediately after the slug containing the surfactant. The thickening agent may be added in concentrations so as to provide a graded viscosity at the trailing edge of the mobility control slug. Use of graded viscosities at both the leading and trailing edges of the mobility control slug is disclosed in U.S. Pat. No. 4,018,281 to Chang. Alternatively, the thickening agent concentration may be relatively constant throughout. Normally, the viscosity of at least a portion of the mobility control slug should be at least as great as the effective maximum viscosity of the oil/water bank it displaces or typically it will be within the range of about 1 to 9 times the viscosity of the reservoir oil. Various thickening agents which may be employed for mobility control purposes are well known to those skilled in the art and include such polymers as the biopolymer "Kelzan", previously identified, and the various partially hydrolyzed polyacrylamides available from the Dow Chemical Company under the trade name "Pusher" chemicals.

The ether-linked surfactant may be present in the aqueous liquid in any suitable concentration depending upon the characteristics of the particular reservoir involved and such factors as surfactant consumption, e.g. by adsorption, and dispersion of the surfactant into the reservoir water. The surfactant concentration may range from 0.01 to 15 weight percent although in most applications the surfactant will be employed in a concentration within the range of 0.1 to 5 weight percent. The alcohol concentration will, of course, depend upon the concentration of the surfactant and the desired ratio of surfactant to alcohol. The aqueous liquid containing the alcohol and ether linked surfactant may be injected in amounts ranging from 0.02 to 3.0 pore volumes with the larger pore volume amounts being used with the lower surfactant concentrations. Usually it will be desired to inject the alcohol surfactant solution in an amount within the range of 0.05 to 2.0 pore volumes.

The graded salinity drive may be effected with a few large step decreases from 0.05 to 3.0 pore volumes or continuously decreased from high to low salinity over a similar range. As shown in the examples, a typical decrease of ¼ to ⅓ of the overall high to low salinity per slug is effective for 0.05 to 1 or more pore volumes. It is desirable to obtain complete recovery of the residual petroleum in the reservoir with minimum throughput, and the graded salinity technique is well adapted to improving recovery efficiency at minimum cost.

While the invention has been described by specifics, there is no intent to limit the inventive concept. Modifications and variations may be made without departing from the following claims.

I claim:

1. In a method of recovering oil from a subterranean formation containing oil and having at least one injection well and at least one production well, the improvement comprising the steps of:
   (a) injecting through an injection well and into said subterranean formation an aqueous saline surfactant solution having sufficient surfactant to effect an interfacial tension between said aqueous saline surfactant solution and said oil of less than about 0.1 dyne per centimeter;
   (b) injecting through said injection well subsequent to said aqueous saline surfactant solution an aqueous brine drive fluid;
   (c) gradually decreasing salt concentration of the drive fluid at a rate sufficient to prevent excessive pressure drop in the formation, wherein the drive fluid salt concentration is decreased incrementally by a plurality of steps between a high concentration and a low concentration, and wherein each incremental decrease is a differential amount less than about one-third of the initial salt concentration; and
   (d) recovering oil from a production well.

2. The method of claim 1 wherein the surfactant comprises a water-soluble ether-linked sulfonate, and the brine drive fluid has an initial saline concentration of salt at least 75% of the salinity of the surfactant solution.

3. The method of claim 2 wherein the surfactant solution comprises a preferentially oil-soluble aliphatic alcohol.

4. The method of claim 3 wherein the surfactant solution comprises at least one sacrificial agent.

5. The method of claim 3 wherein the surfactant solution contains petroleum sulfonate or lignosulfonate.

6. The method of claim 1 wherein the surfactant solution comprises a plurality of petroleum sulfonate materials having disparate molecular weights.

7. The method of claim 6 wherein one of said petroleum sulfonates has an average molecular weight of about 350 and another of said petroleum sulfonates has an average molecular weight of about 465.

8. The method of claim 7 wherein said surfactant solution comprises a preferentially oil-soluble aliphatic alcohol.

9. The method of claim 1, wherein said gradual decrease of step (c) takes place from 0.05 to 3.0 pore volumes of injected drive fluid.

10. The method of claim 1, wherein each increment of drive fluid injected into said injection well of said step (c) is injected in an amount of 0.05 or more pore volumes.

11. The method of claim 1, wherein each increment of drive fluid injected into said injection well of said (c) is injected in amount of 1 or more pore volumes.

12. An improved recovery process for fluent petroleum in a porous formation having speed injection means and production well recovery means which includes a concentrated brine drive and surfactant carrier system comprising the steps of:
   (a) injecting into the porous formation an effective amount of aqueous surfactant composition containing a water-soluble ether-linked sulfonate surfactant, a cosurfactant alcohol, and at least one cosurfactant sacrificial sulfonate or sacrificial sulfonate material in a concentrated brine carrier; and (b) driving the surfactant composition and petroleum recovered therewith by injecting an aqueous drive medium having gradually decreasing brine concentration, wherein the drive fluid salt concentration is decreased incrementally by a plurality of steps between a high concentration and a low concentration, and wherein each incremental decrease is a differential amount less than about one-third of the initial salt concentration.

13. A process for continuous waterflooding of a petroleum-laden formation according to claim 12 wherein the graduated brine drive medium is decreased from an initially high salt concentration linearly to a low salt concentration having sufficient salt to prevent disrupting the formation.

14. A process according to claim 13 wherein said initial salt concentration is about 10 to 20 weight percent and said low salt concentration is about 1 to 4 weight percent.

15. The method of claim 8, wherein the gradual decrease of said gradually decreasing brine concentration of step (b) takes place over 0.05 to 3.0 pore volumes of injected drive medium.

16. A method for the recovery of oil from a subterranean oil reservoir penetrated by spaced injection and production systems in which an aqueous fluid is introduced into said reservoir via said injection system to displace oil to said production system comprising the steps of:

(a) introducing into said injection system a concentrated brine containing a preferentially oil-soluble alcohol of limited water solubility and a preferentially water-soluble anionic surfactant characterized by the formula $$R_1-(OC_nH_{2n})_x\overset{R_3}{\underset{|}{O}}R_2-SO_3^-M^+$$

wherein
R$_1$ is a lipophilic hydrocarbon base provided by a C$_8$ to C$_{22}$ aliphatic group or an aliphatic substituted aryl group containing from 5 to 24 aliphatic carbon atoms with at least one aliphatic substituent containing at least 5 carbon atoms,
n is 2 or 3,
x is a number within the range of 1 to 20,
R$_2$ is a C$_1$ to C$_4$ alkane group,
R$_3$ is a hydrogen, a hydroxy, or a methyl group, and
M is an alkali metal or nitrogenous base, (b) driving the solution of step (a) with a graded salinity brine fluid by decreasing salt concentration in the drive fluid from an initial concentration of about 10 to 20 weight percent to a substantially smaller salt concentration not greater than about 1 percent, wherein the drive fluid salt concentration is decreased incrementally by a plurality of steps, and wherein each incremental decrease is a differential amount less than about one-third of the initial salt concentration; and (c) recovering oil from the production system.

17. The method of claim 16 wherein said alcohol is an aliphatic alcohol containing from 5 to 7 carbon atoms.

18. The method of claim 17 wherein said alcohol is n-hexanol.

19. The method of claim 16 wherein R$_2$ is a C$_2$-C$_3$ alkane group and R$_1$ is an aliphatic-substituted aryl group containing at least 5 aliphatic carbon atoms.

20. The method of claim 16 wherein said surfactant comprises nonylphenyl tetraethoxypropane sulfonate, sodium salt.

21. The method of claim 20 wherein the surfactant containing brine contains a sacrificial lignosulfonate, a petroleum sulfonate and n-hexanol.

* * * * *